United States Patent [19]
McCain

[11] Patent Number: 5,916,310
[45] Date of Patent: Jun. 29, 1999

[54] METHOD AND SYSTEM FOR ENHANCING KEYBOARD FUNCTIONALITY IN AN HTML DOCUMENT

[75] Inventor: William C. McCain, Palo Alto, Calif.

[73] Assignee: Novell, Inc., Provo, Utah

[21] Appl. No.: 08/914,127

[22] Filed: Aug. 18, 1997

[51] Int. Cl.[6] .................................................. G06F 3/00
[52] U.S. Cl. ........................ 710/67; 709/301; 345/156; 345/340
[58] Field of Search ..................... 345/340, 156; 395/887, 681; 707/501; 710/67; 709/301

[56] References Cited

U.S. PATENT DOCUMENTS

| | | | |
|---|---|---|---|
| 4,896,290 | 1/1990 | Rhodes et al. | 710/67 |
| 5,056,057 | 10/1991 | Johnson et al. | 710/73 |
| 5,252,951 | 10/1993 | Tannenbaum et al. | 345/156 |
| 5,404,321 | 4/1995 | Mattox | 708/131 |
| 5,721,849 | 2/1998 | Amro | 345/340 |

OTHER PUBLICATIONS

Walldata Corp., *ARPEGGIO Live!* 1.0 UO1. New Features, World Wide Web publication, printed Jan. 5, 1998, publication date unknown.

*Primary Examiner*—Thomas C. Lee
*Assistant Examiner*—Albert Wang
*Attorney, Agent, or Firm*—Dinsmore & Shohl LLP

[57] ABSTRACT

A method and system for providing enhanced keyboard functionality in an HTML page. An HTML document is provided with an application and an applet which communicate with each other to allow the interception and analysis of all keystrokes entered by a user. Predetermined functionality associated with particular keys can then be provided. Such functionality can include enhanced data editing functionality, implementation of function keys, and enhanced knowledge and control of the cursor location.

20 Claims, 3 Drawing Sheets

METHOD AND SYSTEM FOR ENHANCING KEYBOARD FUNCTIONALITY IN AN HTML DOCUMENT

TECHNICAL FIELD

This invention relates to HTML documents, and more specifically relates to a method and system for providing enhanced keyboard functionality in HTML documents.

BACKGROUND OF THE INVENTION

Before graphical user interface (GUI) environments existed, programs operated in a text-based mode. For example, the first versions of the well-known WORDPERFECT word processor did not provide the pull-down menus and cursor selection features which are taken for granted today. To edit and otherwise modify the contents of a document, users had to learn a variety of combinations of keystrokes. For example, "bolding" certain characters in a document required learning and entering the particular sequence of keystrokes necessary to carry out that function. Similarly, editing text, such as deleting the text between the current location of the cursor and the end of the line, required learning and entering a different sequence of keystrokes. Quickly scrolling through the document in either a forward or backward direction required knowledge of yet another sequence of keystrokes.

GUI environments became very popular because of the ease with which they allow users to interact with a computer. Users can intuitively move a mouse pointer and click on a field on a screen instead of entering a series of keystrokes which bears no obvious relationship to the desired function. Moreover, a GUI allows programs to provide common elements, or interfaces, which are uniform across applications, generating a similar "look and feel" across all programs which run in a particular GUI environment. For example, in the MICROSOFT WINDOWS GUI environment, practically every program offers the same, uniform interface for opening a file, whether the program is a word processor, a spread sheet, or a tax program. Similarly, all programs offer a uniform mechanism for obtaining help information. Such uniformity and commonality across programs in a GUI environment lowers training expenses and improves initial productivity, two very important considerations for businesses.

While GUI environments have eliminated the need to learn keystrokes in many situations, the use of a mouse pointer has its downside as well. Such point-and-click operations with a mouse pointer invariably take much longer to perform than the corresponding keystrokes which they replace. Moving an operator's hand from a keyboard to a mouse drastically reduces the data entry throughput of the operator. In a high productivity data entry environment, production quotas would be seriously impacted if the operator must move a hand away from the keyboard and use a mouse instead of pressing one or more keys. Thus, while learning the appropriate keystrokes may take some time, once they are learned, using a mouse pointer is frequently a step backwards, and results in less productivity rather than more. Recognizing this fact, software developers typically implement software functionality not only in a graphical, point-and-click manner, but also through a series of keystrokes.

World Wide Web (Web) browsers have become very popular software applications. Web browsers download HTML pages (or "documents") from a server and display the contents of the HTML pages on a display screen. Browsers have been written to execute on the most popular computer platforms, and thus provide a cross-platform mechanism for accessing electronic data. This cross-platform capability has made HTML and browsers very popular application platforms.

Because of HTML's cross-platform features, many software applications are being rewritten to operate in the HTML/browser computing paradigm. Because of the flexibility of the HTML language, the rewritten application can often look nearly identical to the previous non-HTML version of the application. Such similarity is frequently desirable to eliminate what would otherwise require extensive retraining of operators. For example, there are many systems in use today which utilize mainframe terminals, such as an IBM 3270 terminal, to interact with an IBM mainframe computer application. Such terminals are not graphical devices, and provide a text-based interface. Such mainframe applications can be intercepted, or "front-ended," to provide the same functionality with the same text-based "look and feel" on a personal computer using a browser. With further customization to the "front-end" software, a more modem GUI-style "look and feel" can often be added to such applications, without making any changes to the original application software on the mainframe.

The disadvantage of the HTML/browser paradigm is that browsers currently provide only limited keyboard functionality. For example, most conventional keyboards contain a row of keys referred to as function keys. In traditional computing environments, function keys are used to initiate a particular action by the computer application. In many computer applications, function keys are used extensively. Unfortunately, browser software does not implement function key functionality, nor does HTML provide any special features by which an application can receive function key keystrokes. In other words, pressing a function key when a browser has the keyboard focus will not cause anything to happen, unless the HTML page somehow intercepts the key press, and acts accordingly. To compensate for the missing function key functionality, the HTML document typically provides an on-screen display of a plurality of buttons which can be selected by a mouse pointer. Each button is associated with a particular keyboard function key, and the association is made obvious by labeling the function keys with text such as "F1". Upon activation of one of the buttons with a mouse pointer, the software application is notified, which can then provide the functionality typically provided by pressing that respective keyboard function key. The problem with this solution is that operator throughput declines dramatically each time an operator moves their hand from the keyboard to the mouse.

Browsers also fail to provide common editing functions that are available in traditional text-based computer applications. For example, practically all text-based applications offer a text insert mode and a text over type mode for adding text to an existing string of characters. Browsers typically do not provide an over type mode. To replace a character, one must first highlight the character by dragging the mouse pointer over the character, or by activating a sequence of characters to highlight the character. Most text-based computer applications also provide data editing functionality through control-key sequences. For example, most such applications allow the use of the control key in conjunction with the End key to erase the characters from the cursor location to the end of field. Such editing functions are also not available in Web browsers.

Certain mainframe applications use the location of the cursor to make decisions. For example, a mainframe text editor may use the cursor location to determine where to split the screen upon a split-screen request from a user. Web browsers fail to provide a mechanism for determining the precise cursor location. This can prevent a mainframe application from being ported to an HTML/browser environment or from providing identical functionality as the previous version. The lack of such information further diminishes the effectiveness of the Web browser environment in providing traditional computer application functionality.

Mechanisms exist for enhancing HTML/browser functionality. Microsoft Corp. offers component technology referred to as "ActiveX" that operates as a "plug-in" to the MICROSOFT EXPLORER Web browser. ActiveX however, is a proprietary technology and currently does not execute in the most popular Web browser, NAVIGATOR, offered by Netscape Communications. Moreover, ActiveX extensions are widely regarded as a security exposure due to the way in which they interact with the client computer's operating system.

The JavaScript scripting language is another mechanism for enhancing the functionality of an HTML page. JavaScript instructions can be embedded in an HTML document to perform a variety of different tasks. However, JavaScript does not have access to keyboard keystrokes, and thus cannot be used by itself to provide enhanced keyboard functionality. Java applets are another mechanism by which an HTML document can be enhanced. An applet is an executable code file that is downloaded and interpreted by the browser along with the HTML document. An applet "owns" only a particular subset of the HTML page, and has no control or interaction with page locations that it does not "own."

It is apparent that a method and system which enhance the functionality currently available in HTML documents or conventional Web browsers, including the ability to react to actual keyboard function keys, perform enhanced editing capabilities, and determine cursor location information, would be highly desirable.

SUMMARY OF THE INVENTION

It is one object of this invention to provide a method and system for enhancing the functionality of an HTML document.

It is another object of this invention to provide a method and system which enables keyboard function key functionality in an HTML document.

It is still another object of this invention to provide a method and system which enables enhanced data field editing capabilities in an HTML document.

It is yet another object of this invention to provide a method and system which enables the determination of cursor location information in an HTML document.

To achieve the foregoing and other objects and in accordance with the purposes of the present invention as described above, a method and system for enhancing keyboard functionality in an HTML document is provided. An HTML document is generated which includes a script application and an applet, the script application communicating with the applet over a bi-directional programming communications interface. The HTML document is downloaded from a server to a browser executing on a client computer. Upon a change in focus on the HTML document, an event handler in the script application is invoked. The event handler invokes a method in the applet requesting that the applet reacquire the focus. Each key press is intercepted by the applet. The applet then invokes a key press action function in the script application which provides predetermined functionality for the respective key press. Such interaction between the script application and the applet achieves complete control over each key press on the keyboard and enables implementation of any desired functionality associated with any key on a conventional computer keyboard.

According to one embodiment of this invention, the applet categorizes each key into one of three key categories, a data key category, a data edit key category, or a function key category. The applet then invokes a particular function in the script application depending upon the category of the key. The script application is passed a code identifying the key which was pressed and implements the desired functionality.

If a data key is pressed, the script application can determine the text field in which the data key is to be inserted, and can update the existing string in such data field either by inserting the data key character at the current location of the cursor, or by replacing a character with the data key character depending upon whether insert mode is on or off. If the key pressed is a data edit key, the script application can implement the predetermined edit sequence as a function of the particular data edit key. If the key pressed is a keyboard function key, the script application can simulate the activation of a respective function key via its corresponding on-screen button.

The script application simulates a "focus" by displaying a blinking cursor in the user-selected text field. The script application also maintains the current cursor location. Such cursor location information can be provided to an application to utilize as desired.

Still other objects of the present invention will become apparent to those skilled in this art in the following description wherein there is shown and described preferred embodiments of this invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings, incorporated in and forming part of the specification, illustrate several aspects of the present invention, and together with the description serve to explain the principles of the invention. In the drawings.

Reference will now be made in detail to present preferred embodiments of the invention, examples of which are illustrated in the accompanying drawings, wherein like numerals indicate the same elements throughout the views.

DETAILED DESCRIPTION

Figure 1:
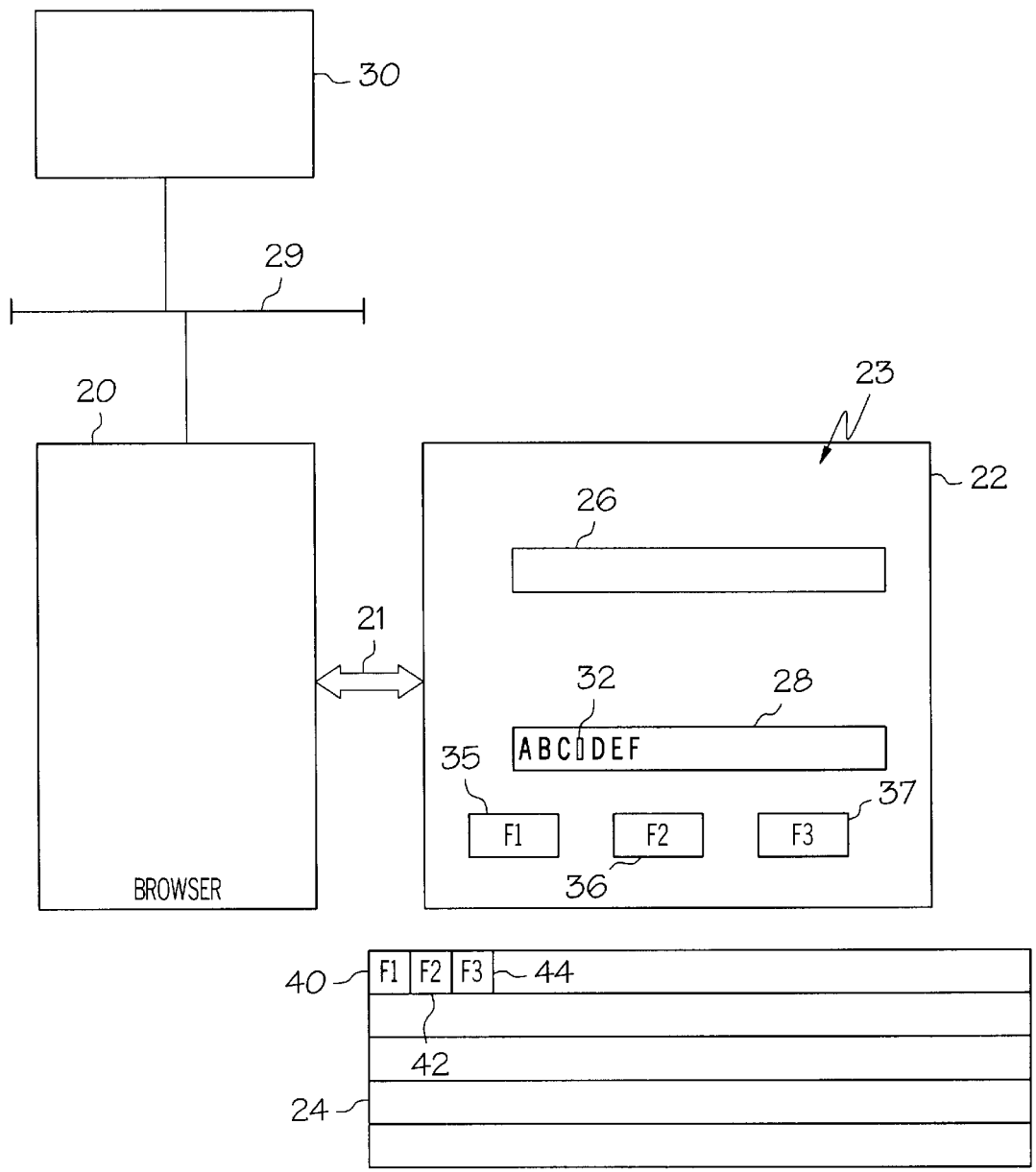
FIG. 1 is a schematic view of a conventional browser, computer screen and keyboard.

Referring now to FIG. 1, a schematic diagram including a browser 20, computer screen 22 and keyboard 24 is shown. Browser 20 receives an HTML page 23 containing "tags" (HTML instructions), Universal Resource Locators (URL) to other files, and other HTML constructs from an application 30 over a network 29. Browser 20 includes the intelligence to interpret this information and generate and display HTML page 23 on computer screen 22. Arrow 21 illustrates that browser 20 interacts, both on output and input, with HTML page 23 displayed on computer screen 22. HTML page 23 typically contains various elements, including "form" elements such as text fields 26 and 28, as well as other user interface components such as buttons 35–37. Such HTML user interface (UI) components (or "widgets") are well known to those skilled in the art. A user can use a conventional keyboard 24 to enter data into a text field of HTML page 23, such as text field 28.

The UI component on HTML page 23 with the current "focus" receives the user-entered data. The concept of a "focus" is well known to those skilled in the art, and relates to which component on a user interface is the "active" component. Typically, some graphical representation is made to inform the user which component currently has the focus. For example, the frame about the perimeter of a button may be thickened to indicate that that particular button has the current focus. With some browsers, pressing the "Enter" key will cause the button with the current focus to be selected. Text fields typically display a blinking cursor image, such as cursor 32, to indicate that that particular text field has the focus. As shown in FIG. 1, cursor 32 implies that text field 28 has the current focus. Thus, any text entered by a user will be received by text field 28.

Character data are typically inserted at the current location of cursor 32. Browsers typically provide only limited text editing functionality, and do not include an "over type" mode when entering data. Consequently, any character data will be inserted before the character which immediately follows cursor 32. To simulate an "over type" mode, one must first highlight the desired characters, which requires either entering a combination of several keystrokes, or selecting the characters with a mouse pointer. This requires many more keystrokes or hand movements than required in a true over type mode.

Practically all conventional keyboards, such as keyboard 24, contain from twelve to twenty-four special keys, commonly referred to as function keys, as shown in FIG. 1 as function keys 40, 42, and 44. Function keys are very popular in mainframe environments, and continue to offer functionality in most modern text-based personal computer programs. Unfortunately, neither conventional browsers nor the HTML language provides any specialized support for such function keys. To simulate the functionality of such function keys, an HTML page developer typically provides a plurality of on-screen buttons, such as buttons 35–37, each of which is associated with the particular action that was formerly performed by a particular function key. To activate the desired function, the user typically moves their hand from the keyboard to a mouse and moves the associated mouse pointer over the desired function key button, such as function key button 35, and activates the mouse, such as by clicking a button on the mouse. Upon such activation, browser 20 can communicate to application 30 that button has been activated. Application 30 can then provide the functionality associated with that function key.

Figure 2:
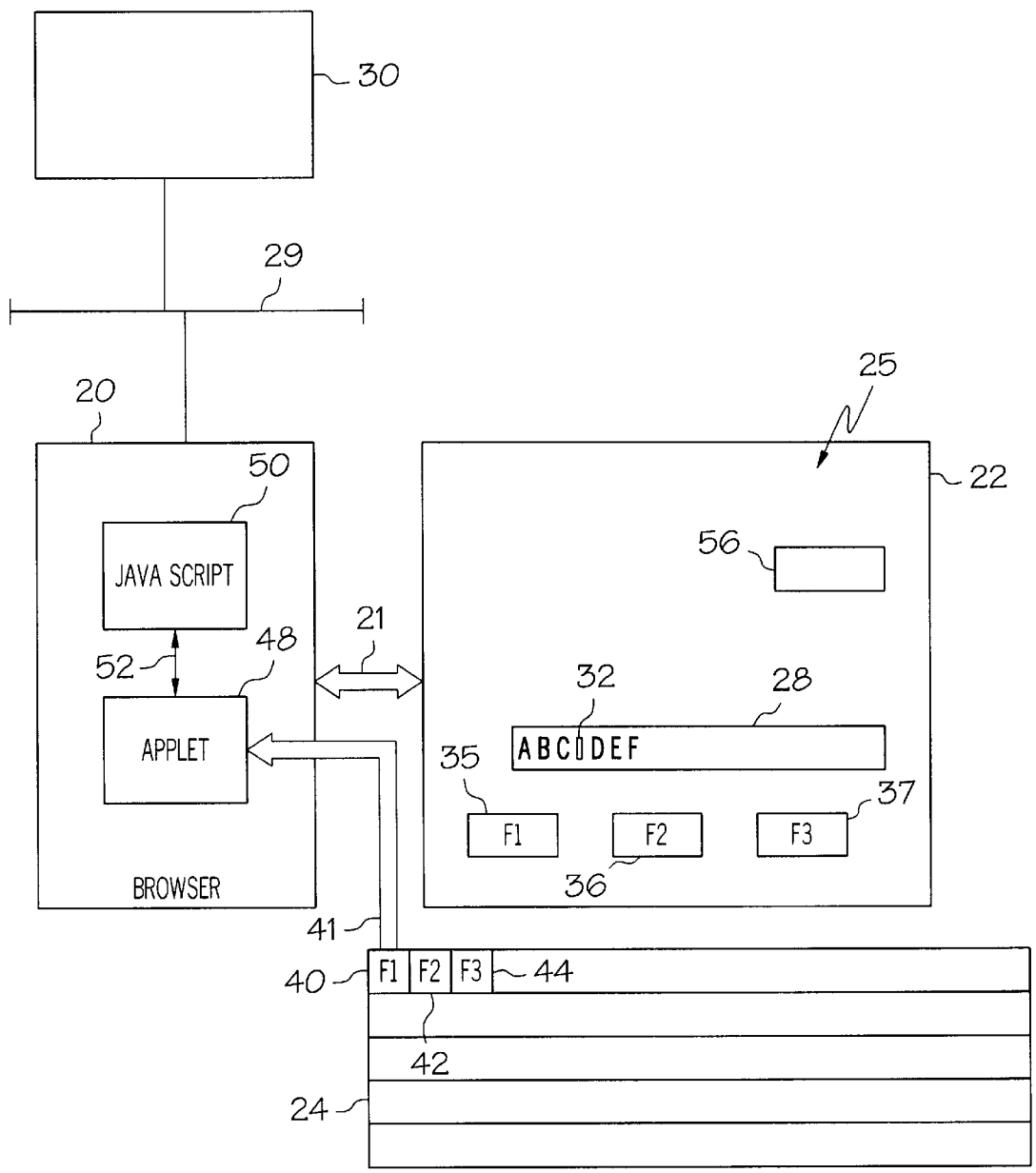
FIG. 2 is a schematic diagram of components of the present invention which implement enhanced keyboard functionality in an HTML page.

FIG. 2 is a schematic diagram illustrating browser 20 interpreting and displaying an HTML document with components of the present invention to enhance keyboard functionality in HTML page 25. HTML page 25 includes a JavaScript application 50 and a URL to a Java applet 48. Browser 20 includes a Java virtual machine to execute Java applets and a JavaScript interpreter to execute JavaScript applications. Most conventional Web browsers contain such components. Browser 20 interprets HTML page 25 and displays it on computer screen 22. Applets typically control only a certain subset of the area of an HTML page, although they can control the entire page if desired. However, the portion of the page controlled by a Java applet is mutually exclusive with the portions controlled by HTML elements and/or JavaScript. Applet 48 controls the subset of HTML page 25 defined by area 56.

Application 50 and applet 48 communicate with each other over interface 52. Interface 52 can comprise a Live-Connect interface available in various web browsers, including the NETSCAPE NAVIGATOR browser. Other such communication interfaces which achieve such interaction between application 50 and applet 48 would also be suitable for use in the present invention. Development of JavaScript applications is described in many books, magazines and manuals, such as, for example *Teach Yourself JavaScript 1.1 in One Week, Second Edition*, Denesch. Similarly, developing Java applets is known to those skilled in the art, and is taught in many Java programming books. The programming instructions which compose a JavaScript application are typically embedded directly into HTML page 25. The programming instructions for Java applet 48 are provided in a separately precompiled code-file referred to as a ".Class" file, and is referenced by a URL in HTML page 25.

Unlike applets, JavaScript applications do not own any specific subset of an HTML page. JavaScript applications can include "functions" or "methods" which can acquire control when a user performs a certain action, such as clicking a mouse when the mouse pointer is over a UI component such as text field 28. Such "functions" are generically referred to as "event handlers", and the association between a particular UI component, such as button 35 or text field 28, and a respective event handler is made through the HTML tag associated with the UI component. However, application 50 by itself has no access to keyboard key strokes. While applet 48 does receive keystrokes entered whenever area 56 has the focus (as represented by arrow 41), it does not receive keystrokes when a UI component outside of its control has the focus. The invention, as described herein, uses features of both JavaScript applications and Java applets to ensure all keystrokes can be intercepted and processed as desired to enable enhancement of the keys on keyboard 40, as well as to provide enhanced cursor location information.

Generally, the present invention operates in part by ensuring that applet 48 always maintains the focus such that all user-entered keystrokes can be intercepted and analyzed by applet 48. As needed, applet 48 can interact with application 50, or according to one embodiment, the JavaScript interpreter directly, to implement the predetermined, enhanced functionality for each particular user-entered keystroke or sequence of keystrokes.

According to one embodiment of this invention, application 50 notifies applet 48 each time a user changes the focus to a different UI component. Such change of focus can occur by clicking a mouse when the corresponding mouse pointer is over a UI component, or by "tabbing" to a different UI component. Upon such notification, applet 48 reacquires the focus. By maintaining the focus, applet 48 ensures that it can intercept and analyze each keystroke entered by a user at keyboard 40. Applet 48 receives such keystrokes and communicates with application 50 to implement the desired enhanced functionality associated with such keystrokes. For example, if a user should press function key 40, applet 48 can intercept the keystroke and communicate the keystroke to application 50. Application 50 can then provide desired functionality, which might be accomplished by simply simulating the activation of button 35 which is associated with the same action as function key 40. Upon the simulated activation of button 35, browser 20 will communicate such selection to application 30 which can then provide the functionality associated with key 40.

One difficulty with applet 48 maintaining the focus relates to enabling user entry of text in a text field, such as text field 28, which is not owned by applet 48. To allow such user entry of text, applet 48 and application 50 visually simulate a blinking cursor to "fool" the user into believing text field 28 has the current focus, when in fact it does not. Such simulation can be accomplished by alternately displaying a cursor-like graphic image, such as cursor 32, and a blank graphic image in text field 28 to simulate a blinking cursor. To a user, such a blinking cursor would imply that text field 28 has the current focus. For example, if a user activates a mouse pointer on text field 28, thereby changing the focus, an event handler within application 50 would obtain notification of such change in focus, and would notify applet 48 that the focus has changed. Applet 48 would immediately reacquire the focus. Application 50 would then simulate a blinking cursor in text field 28. Keystrokes entered by the user are then intercepted by applet 48. Applet 48 communicates those keystrokes via interface 52 to application 50, which then inserts the characters associated with the keystrokes at the simulated cursor location 32. Consequently, it is unknown to the user that text field 28 does not actually have the current focus.

Figure 3:
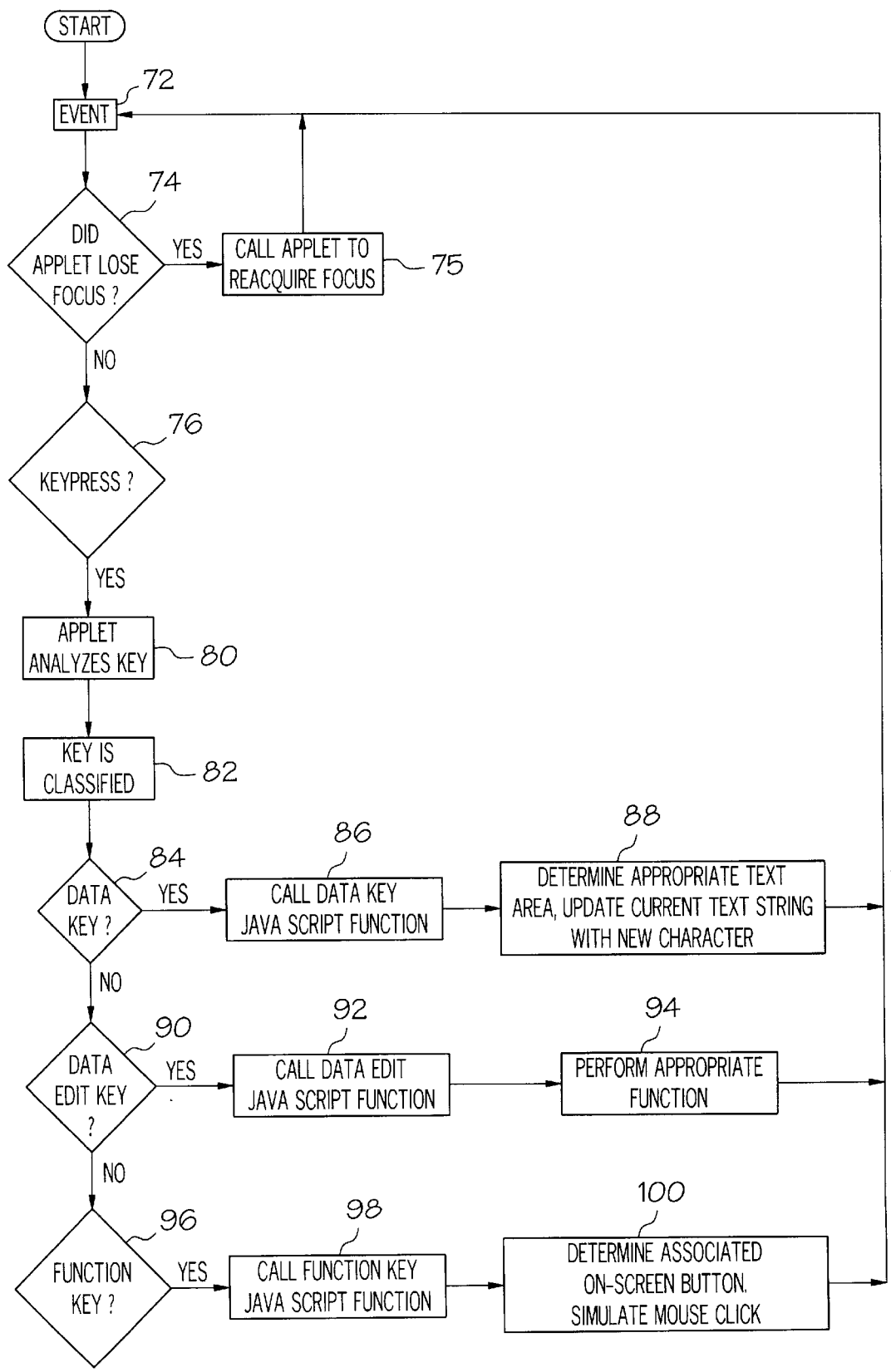
FIG. 3 is a flow diagram illustrating a method for providing enhanced keyboard functionality in an HTML page according to one embodiment of this invention.

FIG. 3 is a flow diagram illustrating a method for providing enhanced functionality in an HTML document according to one embodiment of this invention. FIG. 3 will be described with reference to the schematic diagram shown in FIG. 2. Typically, both applet 48 and application 50 will be in a wait state awaiting input from a user. The user may either enter a keystroke at keyboard 40, or activate a mouse pointer somewhere on HTML page 25. The combination of these potential actions by a user is referred to as an event at block 72. Thus, block 72 encompasses whatever action a user may take with respect to HTML page 25. At block 74, if the user performs some action, such as activating the mouse pointer on a UI component, then an event handler provided in application 50 is invoked by browser 20. Application 50 contains one or more event handlers to handle any situation in which applet 48 may lose focus. The association between UI components on HTML page 25 and an event handler in application 50 is made in the HTML tag associated with that UI component. At block 75, application 50 invokes applet 48, via interface 52, to reacquire the focus. The event handler may, in addition to notifying applet 48 to reacquire the focus, perform additional actions, such turning off the simulated flashing cursor being displayed in the previously selected text area, and turning on the simulated flashing cursor in the newly selected text area. A global variable can also be set identifying the currently selected text area such that application 50 can later easily determine which text input area on HTML page 25 a user is currently editing. A global variable can be used to maintain the relative location of the cursor within the currently selected text area. Or, if desired, an array of global variables can be used to maintain logically independent cursor locations within each and every text area on the page.

Applet 48, upon being invoked by application 50, reacquires the focus, such as by invoking the Java "requestFocus" method. Control then returns to block 72 to await the next event. If at block 76 the event was a key press instead of a change in focus, then at block 80 applet 48 will analyze the key that the user pressed. Applet 48 obtains the key press information because applet 48 always maintains the current focus. For convenience and by convention, applet 48 categorizes the user-pressed key into one of three different categories. If the key is an alphanumeric key, such as a 0–9, A–Z, or a punctuation key, the key is categorized as a data key. If the key relates to an editing function, such as a control key, an arrow key, an insert, home, delete or end key, the key is categorized as a data edit key. If the key is a function key, such as F1–F12, the key is categorized as a function key.

At block 84, if the key was categorized as a data key, applet 48 invokes a data key function in application 50 via interface 52. At block 88, application 50 determines which text field in HTML document 25 is currently being edited by the user, the identification of which is maintained in a global variable, as indicated above. Application 50 then accesses the current text string associated with such text field, and updates the text string at the appropriate location with the character associated with the key.

Applet 48 and application 50 may provide for an over type mode by setting a global flag upon the key press of a certain key, such as the insert key on keyboard 40. If over type mode is currently on, application 50 replaces the character immediately to the right of the current cursor location with the character associated with the key press. If over type mode is off, application 50 inserts the character in between the two characters which are immediately adjacent the current cursor location. Control then returns to block 72 to await another event.

If at block 90 the key was categorized as a data edit key, then at block 92 applet 48 invokes a data edit function in application 50. At block 94 application 50 examines the particular user-pressed key and performs the desired functionality. For example, if the user presses a right or left arrow key, the simulated cursor location is moved one character to the right or to the left, respectively. If the backspace key is pressed, application 50 deletes the character to the immediate left of the current cursor location. If the delete key is pressed, application 50 deletes the character to the immediate right of the cursor. If the tab key is pressed, applet 48 may be invoked to retain the current focus, and the simulated cursor is turned off in the current text field, and turned on in the following text field to indicate transfer from one text field to another. If the home key is pressed applet 48 is invoked to ensure it retains the focus, and the first text field on HTML page 23 is set as the UI component with the current focus. If the end key is pressed, application 50 moves the cursor to the right of the last data character in the field. If the erase EOF key is pressed (that is, the end key is pressed while the control key is held down), application 50 deletes all data characters from the current cursor position to the end of the field. If the particular implementation of the Java applet run-time environment does not support the insert key on the keyboard, the up arrow and down arrow can be used to toggle off and on over type mode. Control then returns to event 72 to await another input.

At block 96, if the key pressed by the user is categorized as a function key, then applet 40 invokes a function key function in application 50. At block 100, application 50 determines which function key was pressed by the user. Application 50 then simulates the activation of a button associated with the same action as that particular function key, essentially causing browser 20 to communicate to application 30 that such button was activated. For example, if a user pressed the 'F1' key (key 40), application 50 simulates the activation of button 35, using a standard JavaScript method such as "click" or "submit". Control then returns to block 72 to await further user input.

To create a blinking cursor for use in simulating the focus in a text field, a JavaScript function can be invoked via a timer every 0.5 seconds to alternately refresh the text string in the text field with a vertical bar (or underscore) and a blank image (or the current data character) at the current cursor location. Different cursors can be used to distinguish over type mode from insert mode.

In addition to providing enhanced keyboard functionality, the present invention provides a mechanism for indicating a precise cursor location for applications which use such information. Such applications are very common in mainframe environments. Because application 50 maintains a simulated cursor location and knows precisely where the cursor exists with respect to the text displayed on HTML page 25, it is quite simple to inform an application of the precise cursor location, through the use of the TYPE= HIDDEN INPUT elements. Similarly, it is quite simple for application 50 to position the cursor at a precise location on receiving an outbound cursor location from a host application.

Because of the flexibility of both Java applets and JavaScript applications, certain aspects of the functionality described herein as being implemented in application 50 could, in fact, be implemented to some extent in applet 48, and, similarly, certain aspects of the functionality described as being implemented in applet 48 could be implemented to some extent in application 50. For example, applet 48 could include the data entry and editing functions for adding, deleting and otherwise modifying text in text fields, and could also contain the event handlers used to determine a change in focus (if this is supported by interface 52). Thus, the "tag" associated with a particular UI component could specify a direct call to a function (event handler) in applet 48 rather than in application 50. However, applet 48 would still need to utilize interface 52 to invoke "system level" JavaScript functions to perform such actions as accessing the text strings in text input areas and simulating the clicking of certain buttons. Moreover, if applet 50 were specified as the event handler for UI components, the JavaScript interpreter within browser 20 would be called to invoke such applet functions, and interface 52 would be utilized to transform those calls into function calls to applet 48. While such an implementation would have the advantage of potentially higher performance since applet 48 is precompiled and application 50 is interpreted, it complicates the generation of a "generic" applet 48 since the applet would be required to know (or find out) much about the particular structure of HTML document 25.

On the other hand, if the keystroke categorization function described previously as a function within applet 48 was moved from applet 48 to application 50, applet 48 could be a "generic" applet which could handle any HTML page, and only application 50 would need to be modified for each particular HTML document.

The foregoing description of preferred embodiments of this invention have been presented for purposes of illustration and description. It is not intended to be exhaustive or to limit the invention to the precise form disclosed. Obvious modifications or variations are possible in light of the above teachings. The embodiments were chosen and described in order to best illustrate the principles of the invention and its practical application to thereby one of ordinary skill in the art to best utilize the invention in various embodiments and with various modifications as are suited to the particular use contemplated. It is intended that the scope of the invention be defined by the claims appended hereto.

What is claimed is:

1. A method for enhancing keyboard functionality in an HTML page, comprising:

providing a script application and an applet in an HTML page;

communicating the HTML page to a browser; providing an interface between the script application and the applet;

implementing an event handler in one of the script application and the applet operative to be invoked upon a change in focus on the HTML page;

implementing a focus method in the applet operative to obtain a keyboard focus upon request by the event handler; and implementing a keypress action function in the script application operative to simulate a respective keypress upon notification by the applet.

2. A method according to claim 1, further comprising providing a keypress method in the applet operative to obtain notification of a keypress.

3. A method according to claim 2, further comprising providing a plurality of keypress action functions in the script application.

4. A method according to claim 3, further comprising receiving notification of the keypress, categorizing the keypress as one of a plurality of different types of keys, and invoking one of the plurality of keypress action functions in the script application as a function of the category of the keypress.

5. A method according to claim 3, wherein the categories comprise a data key, a data edit key, and a function key.

6. A method according to claim 2, further comprising invoking the keypress action function upon a keypress of a function key, and simulating the clicking of a button associated with the function key.

7. A method according to claim 2, further comprising invoking the keypress action function upon a keypress of a data key, determining the appropriate text field, and updating the string in the text field with the appropriate data key.

8. A method according to claim 2, further comprising invoking the keypress action function upon a keypress of a data edit key, determining the appropriate text field, and editing the string field as a function of a cursor location and the current string in the text field.

9. A method according to claim 2, wherein the script application and the applet communicate with one another over a LiveConnect interface.

10. A system for extending keyboard functionality in an HTML page, comprising:

an HTML page containing therein a script application and an applet;

a browser operative to interpret and execute the script application and the applet;

an interface to enable communication between the script application and the applet;

the applet including a request focus method operative to respond to a request from the script application to obtain a keyboard focus; and the script application having a keypress action method operative to simulate the keypress upon request by the applet.

11. A system according to claim 10, wherein the applet further comprises a keypress method operative to obtain notification of a keypress.

12. A system according to claim 10, wherein the applet is operative to receive notification of the keypress, and invoke the keypress action function in the script application.

13. A system according to claim 10, wherein the script application further comprises a plurality of keypress action functions, and wherein the applet is operative to receive notification of the keypress, categorize the keypress as one of a plurality of different types of keys, and invoke one of the plurality of keypress action functions in the script application as a function of the category of the keypress.

14. A method for enhancing keyboard functionality in an HTML page, comprising:

communicating an HTML page having a script application and an applet to a browser;

receiving, by the script application, a change in focus on the HTML page and invoking the applet to maintain the focus;

receiving, by the applet, information identifying a key pressed by a user;

invoking a method in the script application to provide a predetermined functionality associated with the key.

15. A method according to claim 14, further comprising categorizing, by the applet, each key into one of a plurality of key categories, and wherein the invoking a method step comprises invoking a respective method in the script application as a function of the category of the key.

16. A method according to claim 10, wherein the applet and the script application communicate with each other via a bidirectional communications interface.

17. A method for enhancing keyboard functionality in an HTML page, comprising:

providing an HTML page with an applet;

communicating the HTML page to a browser which includes a script language interpreter and provides an interface between the applet and the script language interpreter;

maintaining the keyboard focus with the applet;

obtaining in the applet key information identifying a key pressed on a keyboard; and interacting with the script language interpreter to provide predetermined functionality associated with the key.

18. A method according to claim 17, wherein the key comprises a keyboard function key, and the predetermined functionality comprises simulating the activation of a user interface component associated with the respective function key.

19. A method according to claim 17, wherein the interacting with the script language interpreter comprises invoking a system function.

20. A method according to claim 17, wherein the interacting with the script language interpreter comprises invoking a user-written function which is interpreted by the script language interpreter.

* * * * *